United States Patent [19]

High

[11] 4,362,620

[45] Dec. 7, 1982

[54] PARTITIONED CENTRIFUGE

[76] Inventor: Robert E. High, 358b Monavale Rd., St. Ives, New South Wales, 2075, Australia

[21] Appl. No.: 129,390

[22] Filed: Mar. 11, 1980

[30] Foreign Application Priority Data

Mar. 15, 1979 [AU] Australia ............................ PD8035

May 2, 1979 [AU] Australia ............................ PD8612

[51] Int. Cl.3 ............................................ B01D 45/14

[52] U.S. Cl. ................................ 210/378; 210/380.3; 210/381; 233/28; 233/33; 233/44

[58] Field of Search ............... 210/776, 781, 513, 521, 210/532 R, 167, 187, 774, 790, 800, 801, 197, 360.1, 360.2, 378, 380.3, 381; 233/27, 28, 32, 33, 44

[56] References Cited

U.S. PATENT DOCUMENTS

| | | | |
|---|---|---|---|
| 1,097,561 | 5/1914 | Resines | 233/44 |
| 2,872,104 | 2/1959 | Cizinsky | 210/360.1 |
| 3,152,078 | 10/1964 | Lavanchy | 210/360.1 |
| 3,276,591 | 10/1966 | Hultsch | 210/378 X |
| 3,313,725 | 4/1967 | Tsuda et al. | 210/197 UX |
| 3,332,614 | 7/1967 | Webster et al. | 233/28 X |
| 3,366,242 | 1/1968 | Nicol | 210/197 |
| 3,389,855 | 6/1968 | Muller | 233/28 X |
| 3,559,879 | 2/1971 | Bechard | 233/27 X |
| 3,563,888 | 2/1971 | Kluk | 210/197 |
| 3,623,656 | 11/1971 | Lavanchy | 233/27 X |
| 3,655,058 | 4/1972 | Novak | 210/360.1 |
| 3,731,802 | 5/1973 | James | 210/197 |
| 3,791,575 | 2/1974 | Kartinen et al. | 233/33 X |
| 3,814,307 | 6/1974 | Hengstebeck | 233/44 X |
| 3,905,546 | 9/1975 | Vlasov et al. | 233/32 X |
| 3,943,056 | 3/1976 | Hultsch et al. | 210/378 X |
| 4,010,891 | 3/1977 | Kartinen | 233/33 X |
| 4,048,069 | 9/1977 | Curillier et al. | 210/801 |
| 4,144,172 | 3/1979 | Benwerke et al. | 210/532.1 |
| 4,178,252 | 12/1979 | Krone | 210/521 |
| 4,257,900 | 3/1981 | White et al. | 210/803 |

*Primary Examiner*—Robert H. Spitzer

*Attorney, Agent, or Firm*—Hill, Van Santen, Steadman, Chiara & Simpson

[57] ABSTRACT

A centrifuge for the separation of materials having different densities such as solids and liquids or liquids of different densities has partitions therein disposed generally perpendicularly to the material flow within the centrifuge which form a series of chambers within the centrifuge for respectively retaining floating layers of materials of particular densities, with each chamber being equipped to discharge the material retained therein. Retention and transfer of the materials of different densities is achieved by selective termination of the partitions within the centrifuge at respective heights and depths to accommodate a desired material layer height. An improved separation is attained thereby so that the discharged phases are in substantially pure form.

21 Claims, 19 Drawing Figures

FIG. 4
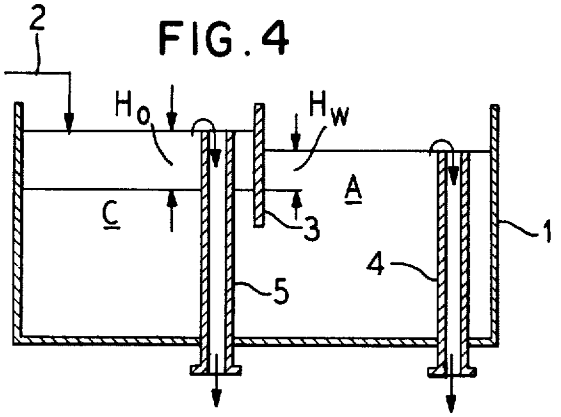
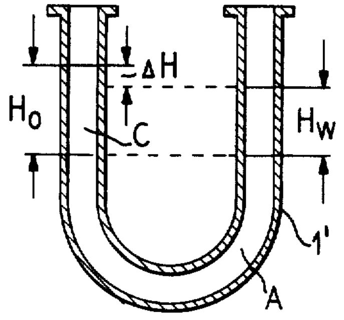
FIG. 5
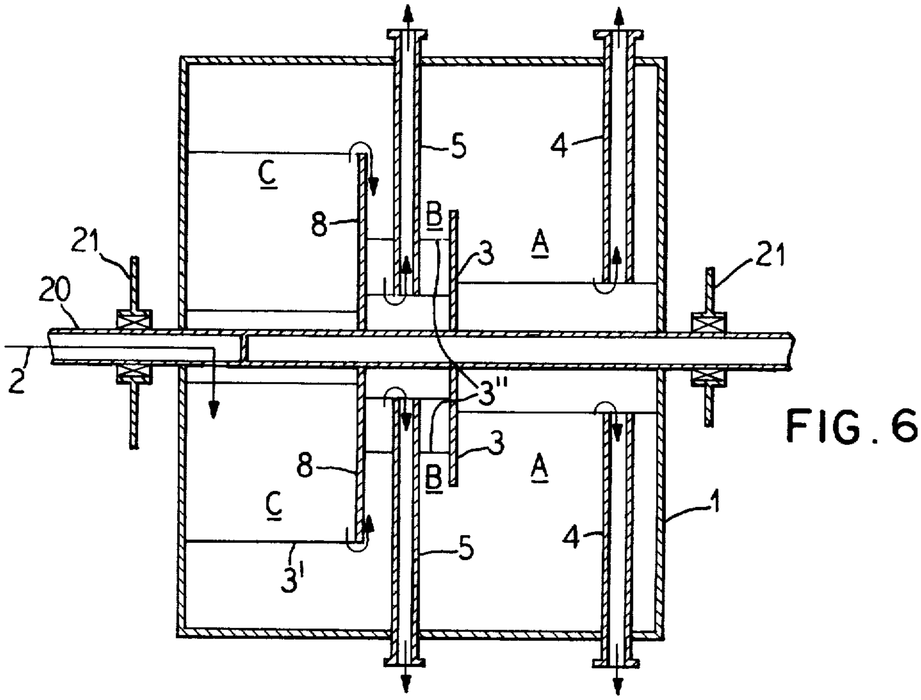
FIG. 6

PARTITIONED CENTRIFUGE

BACKGROUND OF THE INVENTION

1. Field of the Invention

The present invention relates to centrifuges for the continuous separation of solids/liquids mixtures as well as mixtures of liquids having varying densities, and in particular to such centrifuges in which a series of partitions are disposed to retain floating layers of mixture components.

2. Description of the Prior Art

Several types of centrifuges are well known in the art for achieving the continuous separation of mixtures consisting of solids and liquids and mixtures consisting of liquids of different densities. Such centrifuges generally fall into one of three categories known to those skilled in the art as tubular jacket centrifuges, disc centrifuges, and three-phase solid sleeve worm centrifuges. Each of these types of centrifuges is equipped with only two main chambers, namely a liquid or water chamber, and a separation chamber into which the mixture to be separated is introduced. Both chambers are formed by a deflection plate or partition arranged in the discharge area of the centrifuge which has an outer edge projecting into the interface of the liquid phases to be separated.

A problem in the operation of these conventional centrifuges is that of maintaining separation between the separated liquids in the discharge area and the material being introduced into the separation area. This problem arises due to deviations in the level of the boundary or interface layers between the liquid phases as well as changes in the liquid densities or viscosities. The change in density or viscosity may result from the necessity of the liquid flowing around the partition dividing the two chambers. Thus, in known centrifuges of the above-described types, the individual phases separated within the centrifuges cannot be discharged and gained in substantially pure form under fluctuating operating conditions.

SUMMARY OF THE INVENTION

It is an object of the present invention to provide a centrifuge structure which utilizes material properties arising out of the different densities of the materials to be separated to improve separation of the phases and render same in a substantially pure form.

The above object is inventively achieved by disposing partitions within the centrifuge at intervals in the delivery area thereof, with the partitions forming separate chambers for the individual phases. The chambers are in communication with corresponding discharge means or overflow weirs. The level of liquid within respective chambers is determined by the densities of the respective materials to be separated which can be retained and discharged within a particular chamber in substantially pure form. Despite deviations in the liquid density, viscosity, and volume of the various liquid phases occurring during the course of operation of the centrifuge, a relatively stable position of the boundary layers between the liquid phases is achieved by the use of the partitions.

In a further embodiment of the invention, the partitions are arranged for selective adjustment with respect to the depth of immersion in the phases to be separated. The partitions thus may be adjusted to compensate for changing interface layers between the phases during operation. This structure is particularly advantageous when large ranges of liquid density, viscosity and flow-through volume are encountered.

In another embodiment of the invention, some or all of the partitions are notched at the periphery thereof to provide a recess for passage allowing movement of a separated phase from one chamber into a collecting chamber with greater facility.

The inventive concept disclosed herein is particularly suitable for use in a centrifuge with a worm discharge in which the partitions are arranged in the worm courses and/or at the worm spirals. This arrangement allows both solids/liquids mixtures as well as mixtures of liquids of varying densities to be separated simultaneously.

In a final embodiment of the invention, each chamber is provided with a discharge pipe for discharge of the individual phases with the pipes being disposed to radially conduct the separated phase to the outside of the centrifuge. This manner of discharging separated phases results in an undisturbed delivery of the fluid phases from the centrifuge drum. Overflow weirs may be advantageously utilized in place of or in combination with the pipes, both the pipes and weirs can be height-adjustable to accommodate differing density, viscosity and volume conditions.

BRIEF DESCRIPTION OF THE DRAWINGS

FIG. 4 is a trough-and-partition arrangement for use in describing the inventive concept herein.

FIG. 5 is a U-arrangement for describing the inventive concept disclosed herein.

FIG. 6 is a sectional view of a portion of a centrifuge showing a two partition structure.

DESCRIPTION OF THE PREFERRED EMBODIMENTS

Figure 1:
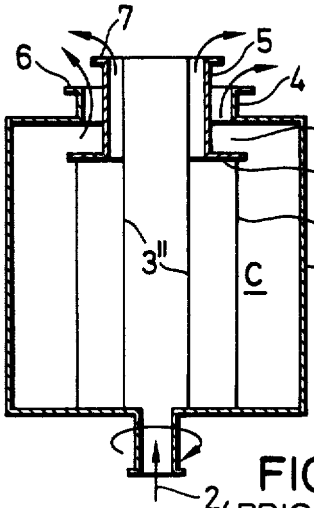
FIG. 1 (PRIOR ART)
FIG. 1 is a sectional view of a conventional tubular jacket centrifuge known in the art.
Figure 2:
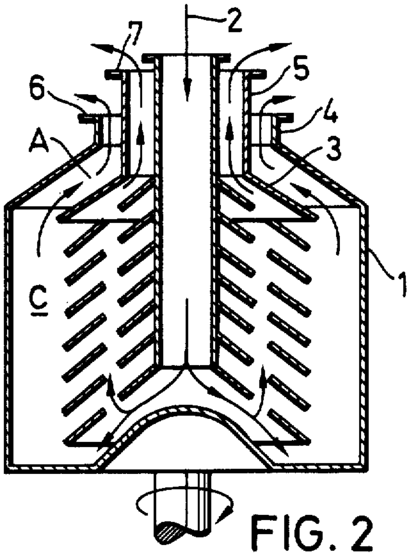
FIG. 2 (PRIOR ART)
FIG. 2 is a sectional view of a conventional disc centrifuge known in the art.
Figure 3A:
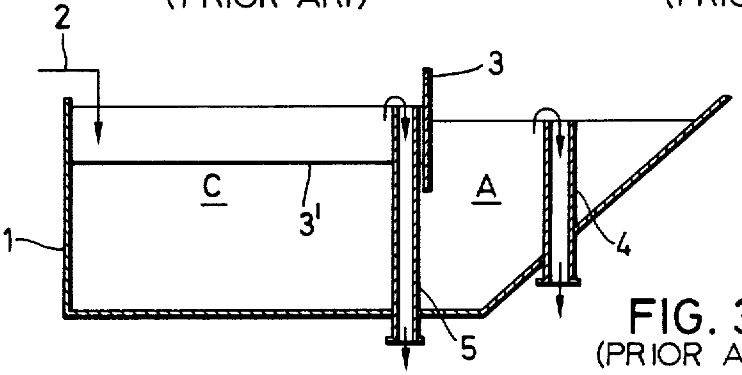
FIG. 3A (PRIOR ART)
FIGS. 3A and 3B are sectional views of full jacket worm centrifuges known in the art.
Figure 3B:
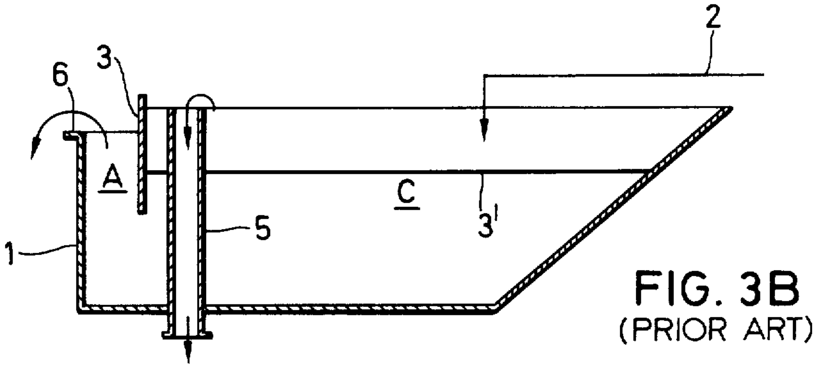
FIG. 3B (PRIOR ART)

Three types of prior art centrifuges are shown in section in FIGS. 1, 2, 3A and 3B. FIG. 1 illustrates a tubular jacket centrifuge, FIG. 2 shows a disc centrifuge, and FIGS. 3A and 3B illustrate two embodiments of a solid sleeve worm centrifuge. Identical components common to each of the three types of centrifuges are referenced with the same numerals. Each of the three types of known centrifuges are capable of continuous separation of mixtures consisting of liquids of differing densities, for example, oil and water.

Each of the above centrifuges has a rotary vessel 1 into which the liquid mixture to be separated is directed, as shown by the arrow 2. The interior of the rotary vessel 1 in each centrifuge has a delivery area including a chamber A and an intake chamber C which are separated by a partition 3 in the shape of a ring wheel. In FIG. 1 the outer edge, and in FIG. 2 the lower edge, of the partition 3 extends below an interface or boundary layer 3' which represents the boundary between the separated liquids which occurs during operation of the centrifuges.

In the centrifuge types shown in FIGS. 1 and 2, the chambers A and C are in open communication with discharges 4 and 5 directed toward the respective upper portions of the centrifuges. The discharge 4 is for discharge of the heavier liquid phase, and the discharge 5 is for discharge of the lighter phase. Each discharge 4 and 5 is provided at a termination thereof with an annular overflow weir, respectively referenced at 6 and 7. The discharge weir 7 is adapted for discharge of the lighter phase represented by the interface 3'', whereas the discharge 4 with the weir 6 is adapted to the liquid surface 3' of the heavier phase.

In the prior art centrifuge shown in FIG. 3A, the discharge devices 4 and 5 are in the form of conduits or pipes extending in a radial direction toward the exterior of the rotary vessel 1. As can be seen from FIG. 3A, the discharge pipe 4 discharges the heavier phase from the chamber A, while the discharge 5 discharges the lighter phase from the chamber C, with the boundary or interface between the phases again represented by 3'.

A prior art single discharge arrangement is shown in FIG. 3B in which a single conduit 5 is utilized to discharge the lighter phase and a discharge weir 6 disposed at an end of the rotary vessel 1 is utilized to discharge the heavier phase from chamber A. Each of the embodiments shown in FIGS. 3A and 3B has a vertical partition 3 which defines the two chambers A and C.

Operation of the prior art centrifuges as well as the inventive centrifuge disclosed herein is facilitated by the schematic drawings FIGS. 4 and 5 illustrating general gravimetric principles which operate to achieve the separation. The following example describes separation of oil and water, however, it will be understood that the particular liquids separated are not pertinent to the inventive concept herein, as long as the liquids have differing densities.

An oil-water mixture is supplied to the intake chamber C of the vessel 1 in the direction of arrow 2 shown in FIG. 4. Because the density of oil is less than the density of water, the oil phase will float on the aqueous phase in chamber C and will be discharged through the discharge conduit 5, the top of which serves as an overflow weir. The water flows under the partition 3 into the discharge chamber A, from where it is similarly discharged through a conduit 4, the top of which also serves as an overflow weir. The depth of immersion of the partition 3 into the mixture is determined by the depth of the oil layer $H_o$, which in turn depends upon the height of the oil and water overflow weirs at the tops of the respective discharge columns 5 and 4. An equilibrium condition between the oil and water phases occurs when the following equation is satisfied:

$$H_o \cdot D_o = H_w \cdot D_w$$

The difference in height between the surface of the water in chamber A and the surface of the oil in chamber C is referenced in FIGS. 4 and 5 as ΔH which is computed as follows:

$$\Delta H = H_o - H_w = H_w \cdot \frac{D_w - D_o}{D_o}$$

where $H_o$ is the height of the oil layer over the oil-water boundary in the chamber C, $D_o$ is the oil density, $H_w$ is the height of the water layer in the chamber A above the level of the oil-water boundary in the chamber C, and $D_w$ is the water density.

As can be seen by comparing FIGS. 4 and 5, the above holds true for the rotary trough vessel referenced at 1 in FIG. 4 as well as the curved vessel 1' shown in FIG. 5.

In the structure of FIG. 4, $H_o$ must be maintained at a value so as to prevent flow of the oil beneath the lower edge of the partition 3. The height of the discharge conduits 4 and 5 may be mechanically adjusted by changing the vertical position of the annular dam of the weir plate or the radial depth of the discharge pipes 4 and 5. The depth of the oil layer and the position of the oil-water boundary, however, cannot be directly controlled. The position of the oil-water boundary changes when the ratio of the liquid densities changes. During operation of conventional centrifuges, the effective height of the discharge weirs changes as a function of the liquid stream which flows over the weir.

The following structures are directed to improvements in partition structures operating according to the above-described principles, as well as to centrifuges embodying the improved structures.

As shown in FIG. 6, a separation vessel 1 having a central shaft 20 rotatable on bearings 21 is provided with an additional partition 8 which extends above the liquid surface and is vertically disposed within the chamber C to which material to be separated is supplied as shown by arrow 2. An additional chamber B is thus formed between the partition 8 and the partition 3. As can further be seen from FIG. 6, the partition 8 extends a greater distance into the liquid than does the partition 3.

The partition 8 separates the chamber C from the chambers A and B so that separate chambers are thereby formed for the different liquid phases having different densities. The liquid phases can collect within each chamber with a minimum of interference arising from communication between the chambers, and more importantly, can be effectively discharged through the conduits 4 and 5 without remixture of the separated phases, thereby facilitating greatly improved recovery of the separated liquids in substantially pure form.

When the liquid mixture enters into chamber C of FIG. 6, the level of the light phase rises within the chamber and the liquid boundary surface 3' falls within the chamber until it reaches the lower edge of the partition 8, at which point the light phase passes from the chamber C into the chamber B, as shown by the arrow. The liquid level in the chamber B and the liquid level in the chamber A thereby remain unchanged by the presence of the partition 8. A second boundary level referenced at 3'' is formed within the chamber B. The liquid level in chamber C will change according to changes in the density ratio of the two liquids in order to maintain the hydraulic balance between the lighter layer in chamber C and the liquid column in chamber A. The changes in density between the lighter and heavier liquids in chamber C also produce a change in the liquid boundary surface 3'' in chamber B, also corresponding to the ratio of the changed liquid densities, because the levels of the layers in the chambers B and A are directly determined by the overflow weirs of the discharges 4 and 5. Changes in those overflow weirs will, however, also change the height of the liquid level in chamber C. The position of the liquid boundary surface is not changed, because the lighter phase always flows beneath the partition 8 into chamber B. For this reason, the device of FIG. 6 maintains both a constant liquid boundary surface as well as a relatively constant volume of the lighter phase liquid in chamber C which boundary surface and volume are independent of changes in the densities between the lighter and heavier phases and are moreover independent of the influence of the overflow heights of the discharge weirs.

Figure 7:
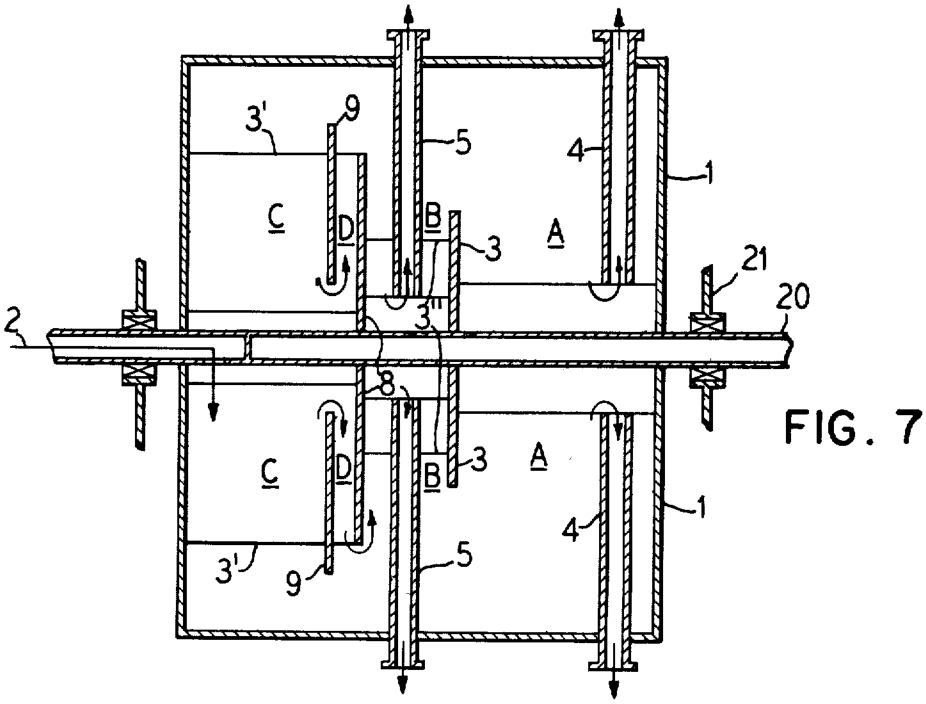
FIG. 7 is a sectional view of a portion of a centrifuge showing a three partition structure.

The partition structure in the separator of FIG. 6 can be improved by the addition of a further partition 9 within the chamber C, as shown in FIG. 7. The partition 9 is disposed vertically within chamber C at a position so that the upper edge of the partition 9 terminates beneath the liquid surface level within the chamber C, whereas the lower edge of the partition 9 projects beyond the boundary surface 3' into the heavier phase layer. The partition 9 is disposed generally parallel to and a short distance from the partition 8, so that an overflow channel D for the lighter phase is formed between the two partitions. This structure achieves an overflow of a very pure lighter phase over the upper edge of the partition 9 into the channel D and from there beneath the partition 8 into the chamber B where the lighter phase arrives at the overflow weir and is discharged through the discharge conduit 5. While the light phase is flowing from channel D beneath the lower edge of the partition 8 into the chamber B, surface tension substantially prevents any mixture whatsoever with the heavier phase which is situated in the lower part of the chamber B and through which the lighter phase must flow.

In many situations requiring the separation of two liquids of differing densities such as, for example, oil and water, solids are also present which must be separated as well. Frequently the solids will have a density between that of oil and water forming an intermediate phase which must be separated. This situation is present when synthetic or wood particles are found in the mixture. The same problems may result when the intermediate phase consists of an emulsion of oil and water. The presence of the intermediate phase leads to a displacement of the boundary layer of the oil phase within the centrifuge, and may also displace the aqueous phase such that in the structure shown in FIG. 7, the intermediate phase may flow over the partition 9 together with the lighter oil phase or under the partition 9 together with the aqueous phase. The separating capabilities of the centrifuge are thus seriously diminished. The problem is dealt with in conventional separators of the type described earlier by allowing the intermediate phase to be collected and discharged either with the aqueous phase or the oil phase, and subjecting the discharged phase containing the intermediate phase to further separation.

Figure 8:
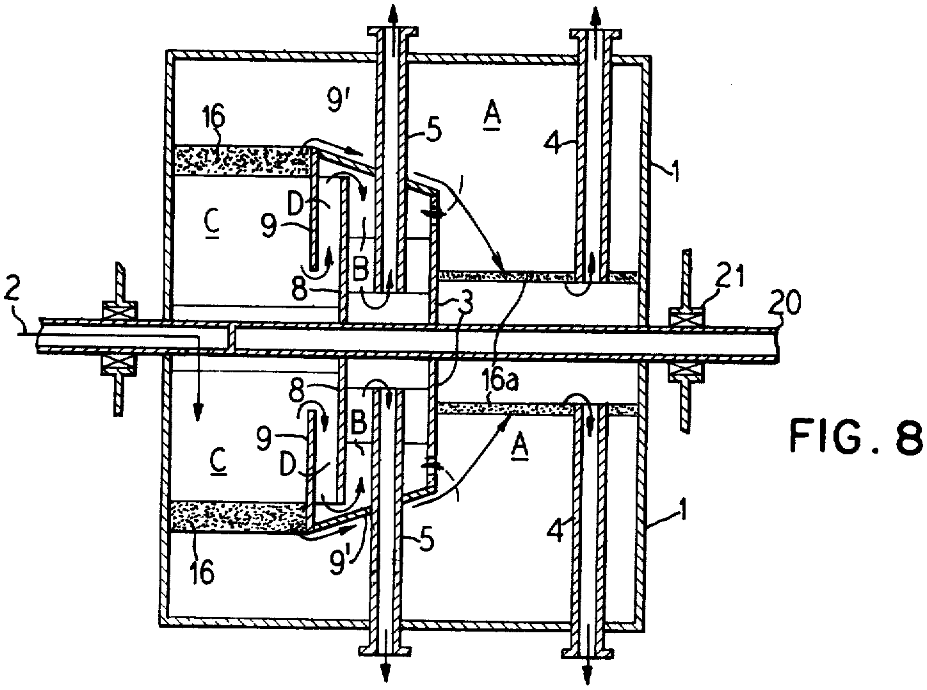
FIG. 8 is a sectional view of a portion of a centrifuge showing a three partition structure with an oblique connecting wall.

In accordance with the principles of the present invention as shown in FIG. 8, the separation of oil and liquid phases can be undertaken simultaneously with separation of the intermediate phase in one vessel, thereby eliminating the necessity of subjecting one of the discharged phases to further separation. In FIG. 8, the partition 9 is provided with an upwardly slanting oblique segment 9' which joins the partition 3 or may project slightly above the lower terminating edge of the partition 3. The intermediate phase collecting in the chamber C, referenced at 16, flows beneath the oblique wall 9' and is transferred into the chamber A where it forms a layer 16*a* and is discharged through the conduit 4. The amount of intermediate phase material in chamber A is maintained at a minimum, so that the oil phase which may be discharged therewith is not substantially polluted thereby. A very pure oil phase free of intermediate phase material can still be discharged from the chamber B through the discharge conduit 5. For this purpose the partition 3 is provided with an aperture through which pure water but no intermediate material can penetrate into the chamber B so that the intermediate phase layer can form without interference within chamber B.

Figure 9:
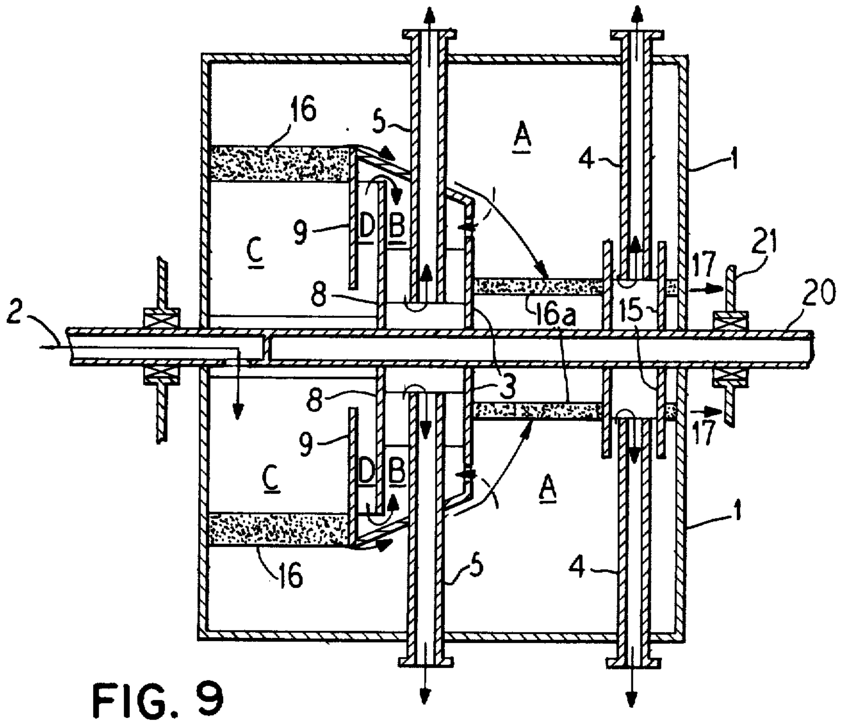
FIG. 9 is a sectional view of the centrifuge portion shown in FIG. 8 with an annular ring surrounding a discharge pipe.

A further improvement may be made in the structure of FIG. 8 to facilitate separate discharge of the intermediate layer 16*a*, as shown in FIG. 9. As shown therein, the discharge conduit 4 is surrounded by an annular socket 15 which extends into the liquid in the chamber A a sufficient depth to prevent discharge of the intermediate layer 16*a* through the conduit 4. The intermediate layer 16*a* may then be discharged in the direction of arrow 17, for example, by a worm conveyor or in any other suitable manner known in the art.

As shown in FIG. 7 the lighter phase collecting in the chamber C flows over the upper edge of the partition 9*b* into the channel D and from there beneath the partition 8 into the chamber B from where it is discharged in a manner known in the art. The height of the liquid boundary surface in chamber C is determined by the depth of the lower edge of the partition 8 within the liquid. The partition 3 is thus disposed to extend deeper into the liquid than the partition 8 in order to prevent escape of the lighter phase from the channel D or the chamber B into the chamber A. The heavier phase flows out of the chamber C beneath the lower edge of the partition 9*a*, which is placed deeper than the lower edge of the partition 8 in the liquid, and the heavier phase thereby arrives in the chamber A.

Intermediate phase material which collects within the chamber C can be carried beneath the partition 9*a* into the chamber A. This intermediate material, however, cannot enter into the channel D or into the chamber B because the bottom edges of the partitions 9*b* and 3 lie significantly deeper within the liquid than the lower edge of the partition 9*a*.

The structures shown in FIGS. 6, 7, 8 and 9 can be employed to particular advantage in solid sleeve worm centrifuges wherein chambers A, B, and C and channel D may be disposed between two successive worm conveyor spirals.

Figure 10:
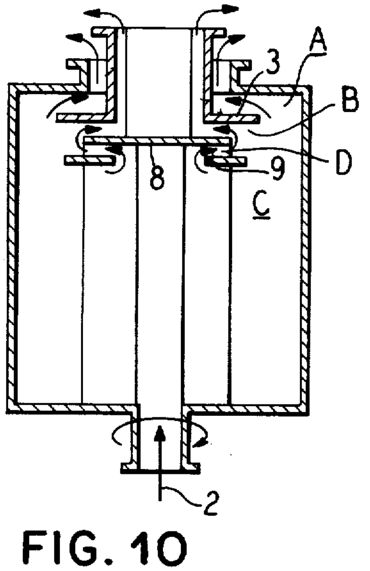
FIG. 10 is a sectional view of the tubular jacket centrifuge of FIG. 1 embodying the present invention.
Figure 12:
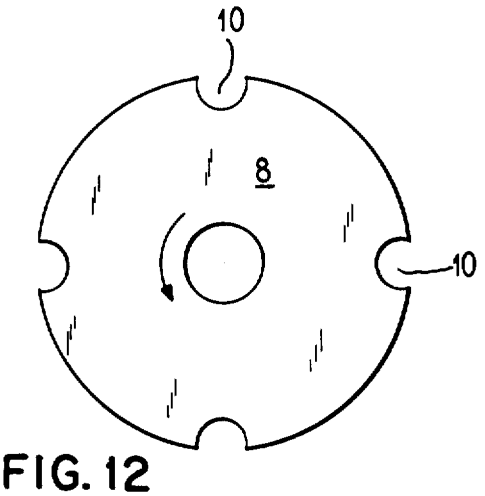
FIGS. 12 and 13 are plan elevational views of notched embodiments of the partitions utilized in the embodiments disclosed herein.
Figure 13:
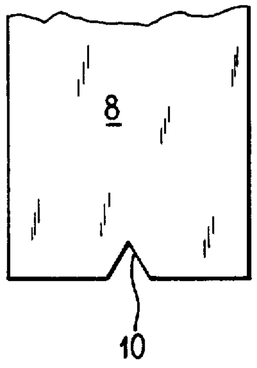

Application of the inventive concepts disclosed herein to the prior art centrifuges discussed earlier is shown in FIGS. 10 and 11. In FIG. 10, a tubular jacket centrifuge is shown wherein the lighter phase passes from the chamber C into the channel D and from there beneath the partition 8 into the chamber B. During this flow, the lighter phase must flow through the liquid layer of the heavier phase in the lower portion of chamber B before it reaches the upper area of chamber B where it is collected. During this passage, the lighter phase may carry a portion of the heavier liquid along. As shown in FIGS. 12 and 13, this occurrence can be reduced by providing a plurality of notches 10 in the outer periphery of the partition 8 so that the lighter can pass through the notches 10 in a compact stream, thus minimizing re-mixing of the heavier and lighter liquids.

Figure 14:
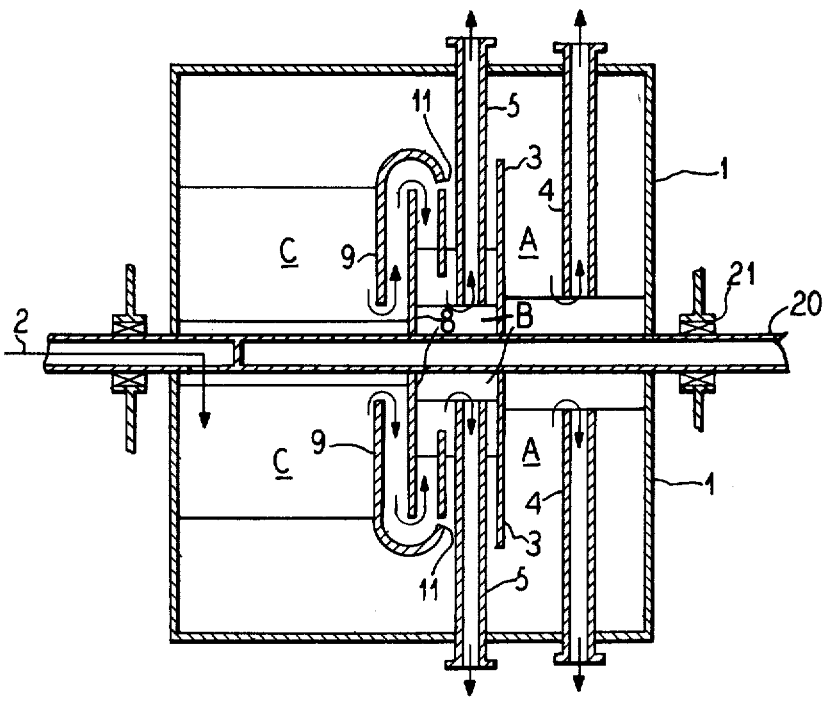
FIG. 14 is a sectional view of a further embodiment of the partition structure shown in FIG. 6 with a curved partition.

In the conventional trough arrangement, an improvement according to FIG. 14 is utilized to minimize the same problem by designing the partition 9 in the shape of a U. In a lower portion of the partition 9, an aperture 11 is provided in order to guarantee that the hydrostatic equilibrium can be achieved without interference in the chamber B.

Figure 11:
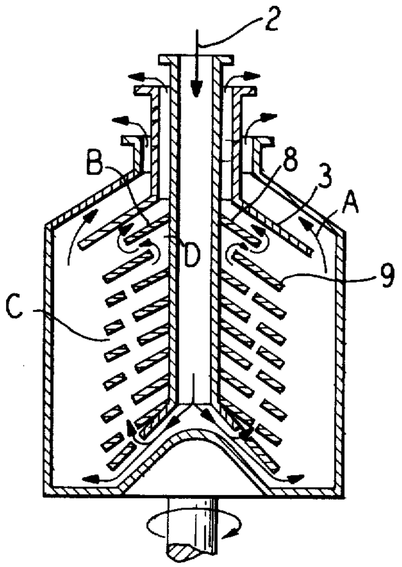
FIG. 11 is a sectional view of the disc centrifuge of FIG. 2 embodying the present invention.

A disc centrifuge adapted in accordance with the principles of the present invention is shown in FIG. 11, in which the operation is similar to that described in connection with FIG. 10.

In each of the above-described embodiments, the partitions are illustrated as essentially flat plates. It will be understood to those skilled in the art, however, that the cross section of each partition can be adapted to the particular demands of the centrifuge form and use.

Figure 15:
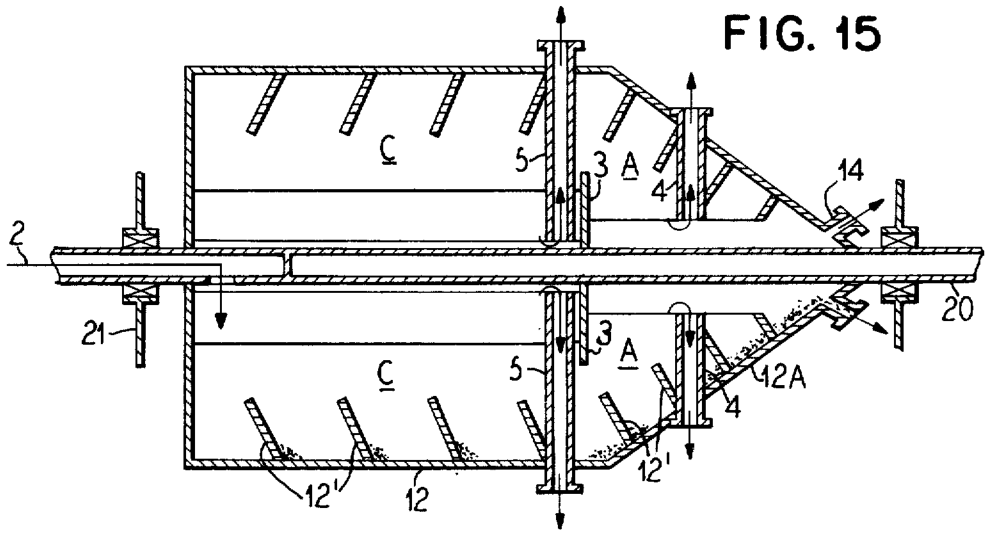
FIG. 15 is a sectional view of a worm centrifuge embodying the partition structure of FIG. 4.
Figure 16:
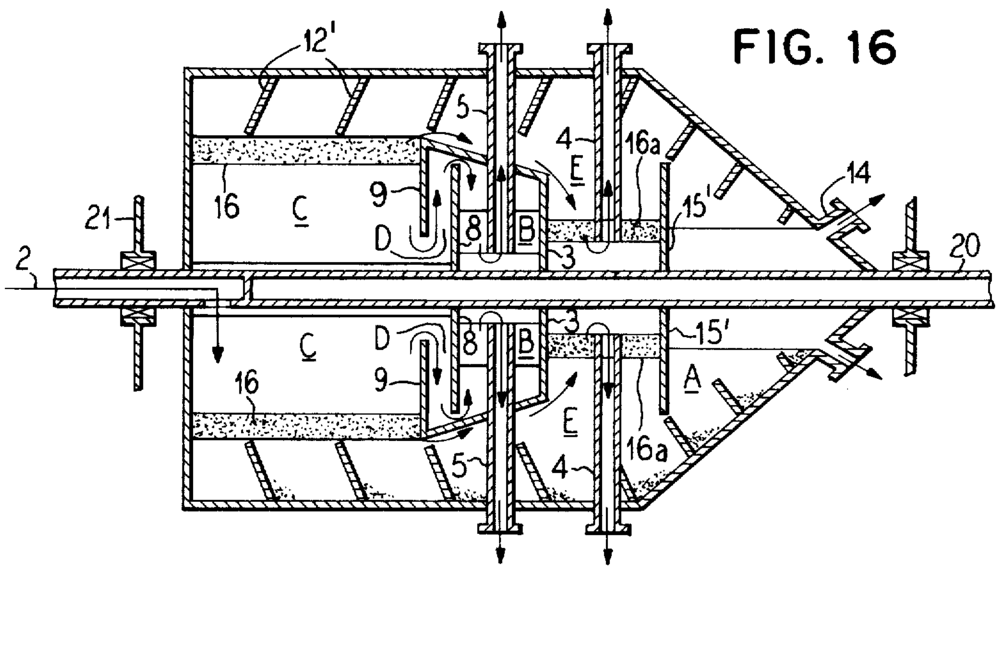
FIGS. 16, 17 and 18 are sectional views of a worm centrifuge embodying the partition structure of FIG. 8 taken in three parallel planes.
Figure 17:
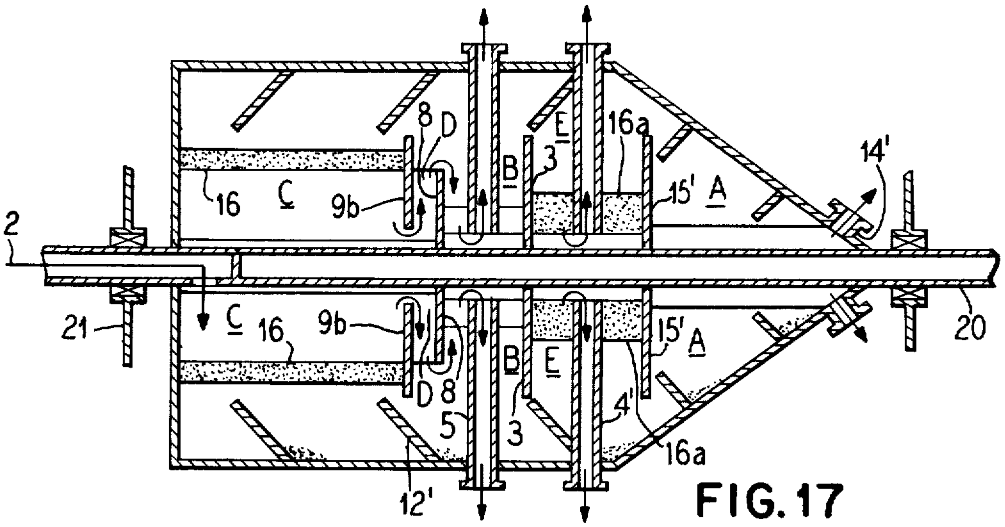
Figure 18:
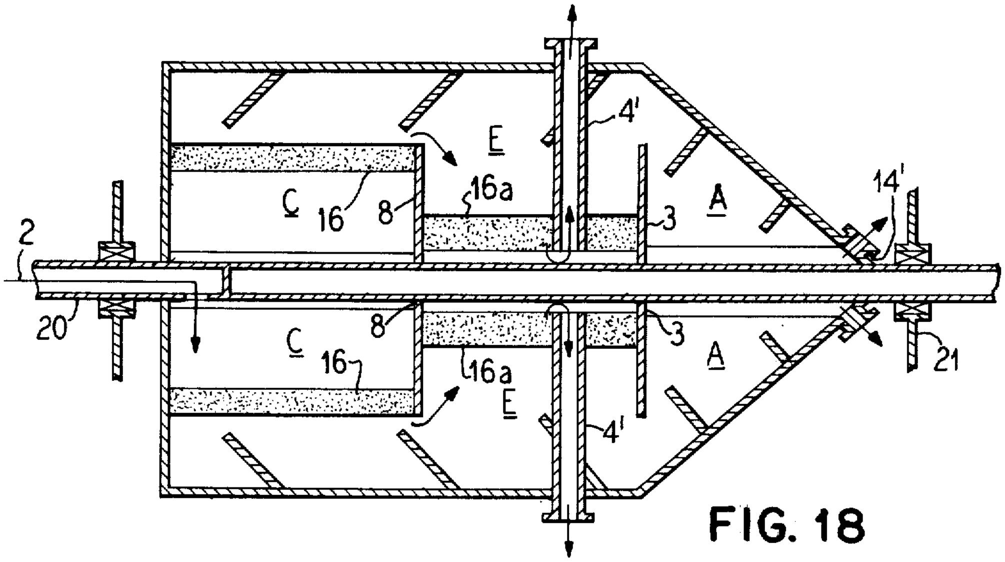

Two embodiments of a three-phase full jacket worm centrifuge embodying the principles of the present invention are respectively shown in FIG. 15 and in FIGS. 16, 17 and 18, having a worm conveyor within the interior of the rotating centrifuge drum which is coaxially arranged therein. The rotational velocity of the worm conveyor may deviate slightly from the rotational velocity of the centrifuge drum 12. The drum 12 is thus provided with worm spirals 12' to collect sedimented solids and transport same along the interior wall of the centrifuge drum to a conical discharge end 12A. As shown in FIG. 15, the solids are transported by the spiral vanes to the top a chamber A and spill over through a discharge 14. In order to simultaneously achieve the discharge of the liquid phases, for example, oil and water, with the solids, corresponding recesses are present in the spirals 12' of the worm conveyor in the area of the discharge conduits 4 and 5. Alternatively, the liquid phases may be discharged from the inside of the centrifuge drum toward the outside by the use of channels or conduits arranged on the worm conveyor or by means of suitable gripper devices known in the art.

In the three-phase solid sleeve worm centrifuge shown in FIG. 16, a further chamber E is formed between the chambers C and A by the presence of an additional partition 15'. The chamber E is for the purpose of the separate discharge of the intermediate phase which may collect within the chamber C beneath the oil layer in the form of an emulsion. The intermediate phase is carried along beneath the partition 9 and arrives in the chamber E from where it is discharged to the outside of the centrifuge through a conduit 4'. Additional sectional views of the centrifuge shown in FIG. 16 are illustrated in FIGS. 17 and 18.

The operation of the centrifuge shown in FIGS. 16 through 18 will be described in the context of the continuous separation of oil, water, and emulsion, and solids from a mixture of these substances. The discharge conduits 4' and 5 or, alternatively, their respective overflow weirs, are set at such a height that they are slightly above the effective height of the solids discharge aperture 14'. The upper edge of the partition **9*b* is set slightly below the effective height of the overflow weir 5. The lower edge of the partition 8 is set as deep as the oil layer within the separation chamber C demands. The lower edge of the partition 9*a* is set slightly beneath the lower edge of the partition 8. The lower edges of the partitions 9, 9*b* and 15' are set deeper than the lower edge of the partition 9*a*. Before introduction of the liquids-solids mixture, the centrifuge is supplied with enough water until the water level nearly reaches the solids discharge aperture 14'. The water is displaced by the delivery of the oil/emulsion/water and solids mixture into the chamber C and flows off beneath the partitions through the solids discharge aperture 14'. The solids, which precipitate at the floor of the vessel, are collected by the worm spirals 12' and are transported toward the solids discharge end where they emerge together with the aqueous phase. The oil collects in the chamber C until it has achieved a sufficient hydraulic height in order to flow beneath the lower portion of the partition 8. The oil then flows from the chamber C over the partition 9*b* into the channel D and from there beneath the partition 8 into the chamber B, from where it is discharged through the conduit 5. The depth of the oil layer in the chamber C is mechanically determined by the depth of immersion of the partition 8. The depth of the layer of oil within the chamber B is the result of the effective height difference between the overflow weir of the conduit 5 and the height of the weir of the solids discharge aperture 14', as well as a result of the density ratios between the oil phase and the aqueous phase. The emulsion collects in chamber C directly beneath the oil layer until it has achieved a predetermined layer height and enters the chamber E beneath the partition 9*a*. The emulsion collecting within the chamber E is then discharged through the overflow weir of the conduit 4'. The depth of the emulsion layer in the chamber E is a result of the effective height difference between the overflow weir of the discharge conduit 4' and the solids discharge aperture 14'**, as well as a result of the density ratio between the emulsion phase and the aqueous phase.

The advantages of a three-phase centrifuge constructed in accordance with the principles of the present invention over conventional three-phase centrifuges can be more fully understood by means of a comparison of an oil production method utilizing the inventive centrifuge disclosed herein in contrast to the same oil production method carried out utilizing conventional centrifuges. Such a method utilizing conventional centrifuges generally requires two centrifuges connected in series. Although the employment of the three-phase solid sleeve worm centrifuge described herein is not limited to this method, operation in the production of oil from tar/sand will be described, but it will be understood to those skilled in the art that any similar separation can be advantageously undertaken utilizing the concepts disclosed herein.

In accordance with conventional methods, a mixture consisting of oil, emulsion, water, clay and fine sand is supplied to a conventional solid sleeve worm centrifuge which removes the main portion of fine sand. This sand contains a significant component of oil, which is generally lost. Although it is desirable to remove the maximum possible portion of clay and sludge in the full jacket worm centrifuge in order to simplify the subsequent separation of the liquid phases, hydroextraction of the further fine solids particles in a standard centrifuge would increase the oil loss in the aqueous phase. The mixture of oil, emulsion, water and fine solids (sludge) is subjected to intensive shearing stresses in the centrifuge resulting from a high rotational speed, and leads to increased emulsion products which render a subsequent separation of the oil and water phases more difficult. The oil, emulsion, water and residual sludge mixture is then hydroextracted in a jet disc centrifuge which ejects three phases, namely, sludge, water and a mixture of oil and emulsion. The clay and the fine solid substances in the initially supplied material result in high maintenance cost associated with this second hydroextraction stage. The jets of the disc centrifuge must be designed relatively large in order to prevent a blockage due to coarse particles still present after the first extraction stage. Such large jets require a significant increase in power consumption as well as a corresponding volume-wise increase in the water flowing through the jet.

The same process may be undertaken by a three-phase solid sleeve worm centrifuge constructed in accordance with the principles of the present invention which minimizes or eliminates many of the aforementioned disadvantages. Utilizing the inventive construction, no oil layer is formed at the solids discharge end of the centrifuge, which oil layer would ordinarily cause a renewed contamination of the previously sedimented solids. The solids are extracted from an acqueous phase and are thus not saturated with an upper layer of viscous oil. Because the solids are generally reduced to a slurry with effluent and pumped into clearing basins, it is not necessary under ordinary conditions to dewater the solids. In this case, it is desirable to extract solids and water together in order to facilitate pumping into the clearing basin. The mechanical load of the worm conveyor of the inventively designed centrifuge is reduced because the solids are not lifted above the liquid surface and are transported along a drying segment in order to remove the surface liquid.

The solids capacity of the inventive centrifuge is thus higher than that of previously known centrifuges. Moreover, centrifuges constructed in accordance with the principles of the present invention render possible the production of an oil phase in the purest form. Even the emulsion phase contains only a low solids content. The emulsion phase can be treated with a demulsifying agent in order to remove the remaining water without requiring large amounts of demulsifying agent which would ordinarily be required if the entire oil phase were mixed with the emulsion. As an alternative solution, however, the emulsion could be supplied to a disc centrifuge which may in this situation be much smaller than that which is normally required, because it would not be necessary to prepare the large volumes of oil and water which are present in the existing methods, and the abrasive particles will already have been removed to a substantial extent.

Fluctuations in the ratio between easily dilutable oil and raw asphalt cause differences in the density of the oil and emulsion phases. The density of the emulsion phase likewise depends upon the ratio of the components of diluted asphalt and water. Changes in the density ratio of the various phases have negative effects on the output of conventional disc centrifuges. These disadvantages are greatly reduced by means of incorporating the additional partitions as illustrated in FIG. 11.

It will be apparent to those skilled in the art that the invention disclosed herein may be employed in a similar manner in disc centrifuges with jets arranged at the circumference for the continuous discharge of solids, as well as in disc centrifuges in an open jacket configuration. The inventive concepts disclosed herein may further be employed in any type of centrifuge having one or more centripetal pumps or stripping devices and separated discharges for the liquid phases. Separate discharge of the de-watered solids may also be achieved by utilizing the principles of the present invention.

Although other modifications and changes may be apparent to those skilled in the art, it is the intention of the inventor to embody within the patent warranted hereon all changes and modifications as reasonably and properly come within the scope of his contribution to the art.

I claim:

1. A centrifuge for the continuous separation of solid-liquid mixtures and mixtures of liquid with different densities, said centrifuge having a drum with end walls, said drum being rotatable about a hollow stationary centrally disposed shaft, said centrifuge comprising:

a first disc mounted on said shaft inside said drum and radially extending a first distance from said shaft and terminating in an outer edge beyond the boundary layer between the phases to be separated;

a second disc mounted on said shaft inside said drum and radially extending a second distance from said shaft and terminating in an outer edge, said second distance being less than said first distance, and said first and second discs dividing the interior of said drum into a first chamber between one end wall of said drum and said first disc, a second chamber between said first and second discs, and a third chamber between said second disc and another end wall of said drum;

a means for charging said first chamber with a mixture to be separated, whereby a lighter of said phases flows from said first chamber around said first disc upon rotation of said centrifuge and is collected in said second chamber, and a heavier of said phases is collected in said third chamber; and a discharge means for each of said second and third chambers for respectively discharging said lighter and said heavier phases therefrom to an exterior of said centrifuge.

2. The centrifuge of claim 1 further comprising a third disc mounted on said shaft in said first chamber, said third disc having an inner edge spaced from said shaft in said first chamber and an outer edge radially extending beyond said outer edge of said first disc, such that said third disc permits flow of said lighter phase only over said inner edge thereof, and substantially prevents flow of said lighter phase around said outer edge thereof.

3. The centrifuge of claim 2 wherein said second disc has an outer edge and the respective outer edges of said third and second discs are connected by an slanting oblique wall.

4. The centrifuge of claim 3 wherein said second disc has at least one aperture therein.

5. The centrifuge of claim 2 wherein said third disc has a U-shaped cross section with upright portions of said U-section being disposed respectively in said first and second chambers on opposite sides of said first disc.

6. The centrifuge of of claim 5 wherein said third disc has at least one aperture therein in a portion of said disc disposed in said second chamber.

7. The centrifuge of claim 1 further comprising a fourth disc mounted on said shaft in said third chamber, said fourth disc forming a fourth chamber between said second disc and said fourth disc for collection of an intermediate phase in substantially pure form, and a discharge means in said fourth chamber for discharging said intermediate phase.

8. The centrifuge of claim 1 including an adjustable means for mounting said discs in said drum for selective adjustment of the depth of immersion of each of said partitions in said mixture to be separated.

9. The centrifuge of claim 1 wherein said first disc has a plurality of notches at a periphery thereof.

10. The centrifuge of claim 1 wherein said discharge means are a plurality of separating weirs respectively disposed in said chambers in respective communication with a plurality of conduits leading from an interior of said drum to an exterior thereof.

11. The centrifuge of claim 1 wherein said discharge means include an adjustment means for adjusting the height of said discharge means within said mixture to be separated.

12. The centrifuge of claim 1 further including an annular socket receiving a top of said discharge means in said third chamber, said socket extending a distance into the liquid in said third chamber and terminating therein below a top of said discharge means.

13. A solid-sleeve worm centrifuge for the continuous separation of solids-liquids mixtures and mixtures of liquids of varying densities comprising:

a generally cylindrical vessel having a vertical wall at one end thereof and a conical taper at an opposite end thereof;

a means for rotating said vessel;

a spiral carried on the interior surface of said vessel, said spiral extending along the entire length of said vessel in a direction of liquid flow therein;

an inlet means for charging said vessel with a mixture to be separated;

a first partition mounted in the interior of said vessel substantially parallel to said vertical wall of said vessel and extending a first distance into the mixture to be separated;

a second partition mounted in the interior of said vessel downstream of said first partition and substantially parallel thereto, said second partition extending a second distance into the mixture to be separated, said second distance being less than said first distance;

whereby said first and second partitions in combination with said vessel form a first chamber for the hydrostatic collection of a light phase and a second chamber for the hydrostatic collection of a heavy phase in substantially pure form, a discharge means extending into said first chamber for removal of said light phase therefrom;

a discharge means extending into said second chamber for removal of said heavy phase therefrom; and a discharge means disposed near an apex of said conical taper for discharging sediment collected and carried by said spiral.

14. The improvement of claim 13 further comprising a third partition mounted upstream of and substantially parallel to said first partition, said third partition disposed in said vessel such that an upper edge of said third partition is below an upper edge of said first partition, and a lower edge of said third partition is below a lower edge of said first partition.

15. The improvement of claim 14 wherein said second partition has a lower edge and the respective lower edges of said third and second partitions are connected by an upwardly slanting oblique wall.

16. The improvement of claim 15 wherein said second partition has at least one aperture therein.

17. The improvement of claim 14 wherein said third partition has a U-shaped cross section with upright portions of said U-section being disposed on opposite sides of said first partition.

18. The improvement of claim 17 wherein said third partition has at least one aperture therein in a portion of said partition downstream of said first partition.

19. The improvement of claim 13 wherein said first partition has a plurality of notches at a periphery thereof.

20. The improvement of claim 13 including a fourth partition mounted in the interior of said vessel perpendicular to the direction of flow therein downstream of said second partition, said fourth partition forming with said second partition a third chamber for the hydrostatic collection of an intermediate phase in substantially pure form.

21. The centrifuge of claim 20 wherein a discharge means extends into said fourth chamber for separate removal of said intermediate phase therefrom in substantially pure form.

* * * * *